(12) United States Patent  (10) Patent No.: US 6,619,226 B2
Rooke  (45) Date of Patent: Sep. 16, 2003

(54) SIFTER SEASONING APPLICATOR

(75) Inventor: Robert James Rooke, Plano, TX (US)

(73) Assignee: Recot, Inc., Pleasanton, CA (US)

(*) Notice: Subject to any disclaimer, the term of this patent is extended or adjusted under 35 U.S.C. 154(b) by 0 days.

(21) Appl. No.: 10/078,173

(22) Filed: Feb. 19, 2002

(65) Prior Publication Data

US 2003/0154915 A1 Aug. 21, 2003

(51) Int. Cl.$^7$ ................................................ A23G 3/00
(52) U.S. Cl. ..................... 118/19; 118/22; 118/612; 118/308; 118/417; 222/238; 99/494
(58) Field of Search ................... 118/19, 22, 64, 118/612, 57, 308, 417; 426/289; 209/315, 381, 382; 222/238; 99/494

(56) References Cited

U.S. PATENT DOCUMENTS

| 3,635,326 | A |   | 1/1972  | Langlinais |         |
|-----------|---|---|---------|------------|---------|
| 3,727,801 | A | * | 4/1973  | Caridis et al. | 222/196 |
| 3,792,774 | A | * | 2/1974  | Rosenblum  | 210/495 |
| 4,270,486 | A |   | 6/1981  | Leverenz   |         |
| 4,419,953 | A |   | 12/1983 | Fowler     |         |
| 4,543,907 | A |   | 10/1985 | Fowler     |         |
| 4,576,108 | A |   | 3/1986  | Socola et al. |      |
| 4,597,358 | A |   | 7/1986  | Aitken     |         |
| 4,614,162 | A |   | 9/1986  | Ryan et al. |        |
| 4,907,720 | A |   | 3/1990  | Henson et al. |      |
| 5,078,090 | A | * | 1/1992  | Richman    | 118/702 |
| 5,090,593 | A |   | 2/1992  | Ejike      |         |
| 5,386,939 | A |   | 2/1995  | Ruegg      |         |
| 5,707,448 | A |   | 1/1998  | Cordera et al. |     |
| 5,846,324 | A |   | 12/1998 | Marshall et al. |    |
| 6,145,708 | A | * | 11/2000 | Schmidt    | 222/196 |

* cited by examiner

Primary Examiner—Laura Edwards
(74) Attorney, Agent, or Firm—Colin P. Cahoon; Carstens, Yee & Cahoon, L.L.P.

(57) ABSTRACT

The seasoning applicator applies seasoning onto snack food products such as potato chips, corn chips, tortilla chips, and the like in a two-dimensional seasoning pattern. A two compartment sifting assembly has a first top layer having a screen where seasoning is initially deposited. Upon vibration, the seasoning is passed through the top layer screen into a lower compartment. Therein, the seasoning is further distributed across the surface of the lower layer screen, which generally has a screen with smaller openings than the top layer screen. This promotes the even distribution of seasoning through the lower screen. Thereby, a two-dimensional seasoning pattern is created for depositing on a moving bed of snack food products.

18 Claims, 3 Drawing Sheets

SIFTER SEASONING APPLICATOR

BACKGROUND OF THE INVENTION

1. Technical Field

The present invention relates to an apparatus for applying seasoning to snack food products such as potato chips, tortilla chips, corn chips, and the like. More particularly, the invention relates to an apparatus for applying seasoning in a two-dimensional pattern.

2. Description of Related Art

Snack food products, particularly seasoned snacks, are popular snack choices with consumers. For example, potato chips, tortilla chips, corn chips, and the like are seasoned prior packaging. To season, snack food products are typically seasoned by sprinkling one or more seasonings onto the surface of the snack food products. The seasonings for snacks include salt, barbecue flavoring, sour cream and onion flavor, vinegar flavor, cheese, and others.

Seasoning is spread onto the snacks by sprinkling on the surface of the products after they have been cooked but prior to packing. The application and distribution of the seasoning onto the snacks is a factor in product quality. If the seasoning is deposited onto the snacks in clumps some snacks receive excessive amounts of the desired quantity of seasoning while others receive less than desired amounts of seasoning. Basically, the overall quality of the snacks will be poor if the seasoning is applied too clumpy. In addition to the aesthetic aspects of seasoning distribution, economics suffer if the seasoning is applied inefficiently.

In FIG. 1, a prior art seasoning applicator 10 is shown for seasoning snack food products 12. Unseasoned snack food products 12 enters cylindrical drum 14 at one end through a funnel 18. The end of the drum 14 through which the snack food products 12 are introduced is with respect to a discharge end 20. Thereby, snack food products 12 are moved by gravity toward discharge end 20. As drum 14 is axially rotated, baffles 16, which extend longitudinally along the interior surface of drum 14, lift food products 12 to aid in applying the seasoning. A seasoning dispenser 22 has a tube portion 24 that extends into drum 14. Within tube 24 is an auger 26 that is in communication with seasoning hopper 30. As auger 26 is spun, seasoning from hopper 30 is carried through tube 24 and exits through apertures 32 which are disposed on a portion of tube 24 that extends into drum 14. As seasoning is supplied into drum 14, a seasoning curtain 34 is formed through which snack food products 12 pass through.

As shown in the prior art device of FIG. 1, conventional seasoning dispensers apply seasoning in powder form onto snack food products through a tube having holes or slots. Other prior art devices apply seasoning from an edge of a vibrating pan that extends into a drum. With either type of device, a one dimensional flow pattern of seasoning is applied as a curtain. To achieve a desired amount of seasoning across the surfaces of the snack chips, enough seasoning must be applied via the curtain. Since snack products have curved shapes and are fed into the drum in multiples, certain areas will be restricted from receiving seasoning directly from the seasoning curtain. Thereby, the drum rotation is further needed to apply the remaining seasoning onto these uncoated areas. Additionally, the curtain of seasoning created is often discontinuous because of equipment adjustment or from the flow properties of the seasoning powder. The result of this seasoning is often sub-optimal coverage because of the uneven coverage across the snack products.

Consequently, a need exists for a seasoning device that provides uniform seasoning coverage onto snack products. An applicator that can apply seasoning over a wider area as opposed to a curtain will produce more uniform coverage. Thereby, snack products with uniform seasoning coverage could be produced.

SUMMARY OF THE INVENTION

An exemplary embodiment of the invention is for a seasoning applicator for applying seasoning onto snack food products traveling on a tumbling bed. The seasoning applicator comprises a seasoning assembly having first and second layers wherein the first layer is disposed above the second layer. The first layer and second layer have a screen extending across a portion of each, which allows seasoning to pass there through. To promote the seasoning through the screens, a vibratory mechanism is disposed in communication with the seasoning assembly. Upon vibrating, seasoning supplied to the top layer passes through the top screen and then into the second layer. The seasoning in the second layer is then passed through the bottom screen to create a two-dimensional seasoning pattern for seasoning the snack food products that is disposed beneath the seasoning assembly.

In another embodiment of the seasoning applicator, one or more partition walls are provided in the top layer. These partition walls extend upward from the top screen and across the interior portion of the upper layer. By using partition walls, a smaller region of seasoning passing through to the second layer is created. This allows for control of the size of two-dimensional seasoning pattern, which can then be set according a predetermined width and/or length.

To facilitate the disintegration of any clusters of seasoning, one or more shaped objects such as balls can be included in the second layer. Thereby, any seasoning clusters, which are large particles of seasoning adhering to each other, are reduced in size to promote uniform seasoning and to prevent obstruction of the holes in the screens.

The above as well as additional features and advantages of the present invention will become apparent in the following written detailed description.

BRIEF DESCRIPTION OF THE DRAWINGS

The novel features believed characteristic of the invention are set forth in the appended claims. The invention itself, however, as well as a preferred mode of use, further objectives and advantages thereof, will be best understood by reference to the following detailed description of illustrative embodiments when read in conjunction with the accompanying drawings, wherein:

DETAILED DESCRIPTION

Seasoned snack food products produced with an exemplary embodiment of the invention are coated with seasoning while being transported across a tumbling bed device. In practice, snack food products, such as potato chips, corn chips, tortilla chips, puffed-extruded cornmeal, or the like, are seasoned prior to being packaged for sale to consumers. Seasoning is typically applied to snack food products while the products are tumbled in a tumbling bed device such as a conventional seasoning drum.

Figure 1:
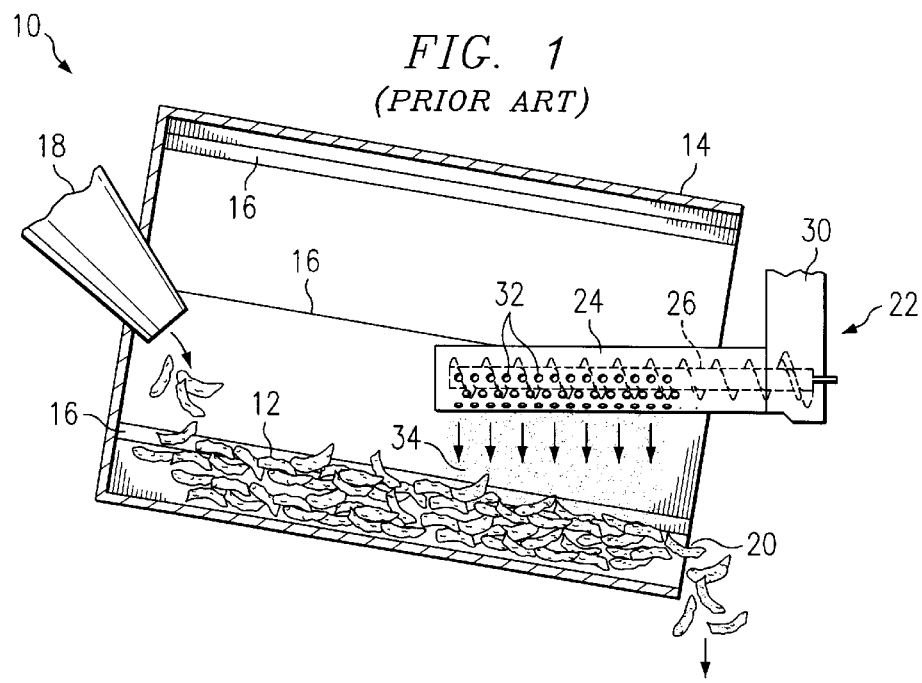
FIG. 1 is a cross-sectional side view of a rotating tumbling drum of the prior art having a seasoning applicator applying a curtain of seasoning.
Figure 2:
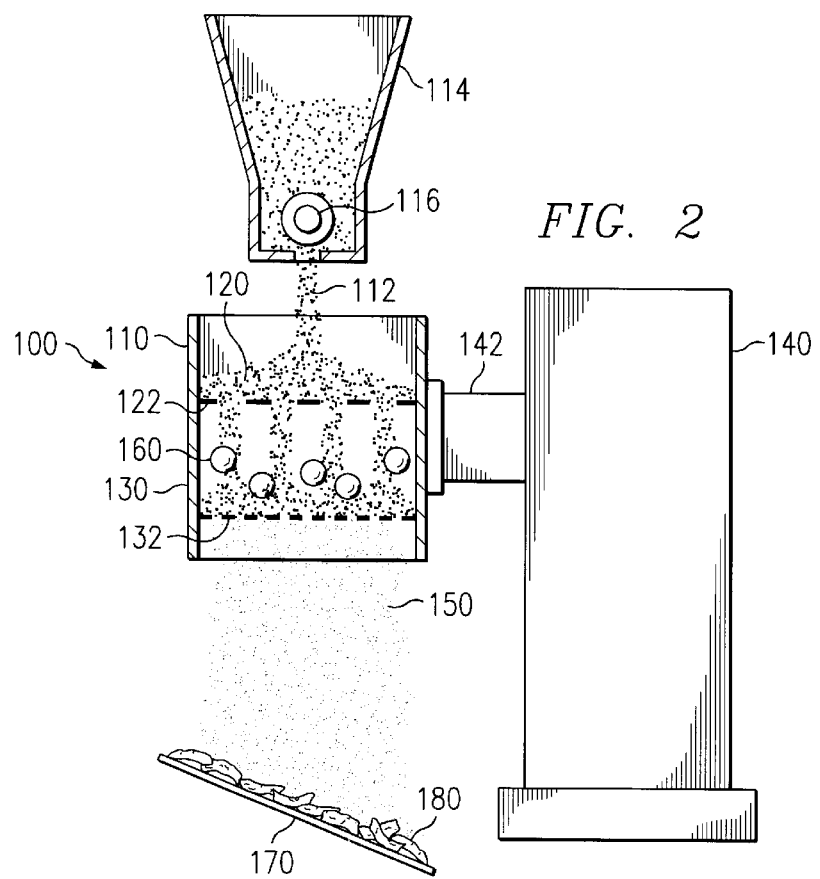
FIG. 2 is a cross-sectional side view of a seasoning applicator of the invention being used to season snack food products with a two-dimensional seasoning pattern.
Figure 3:
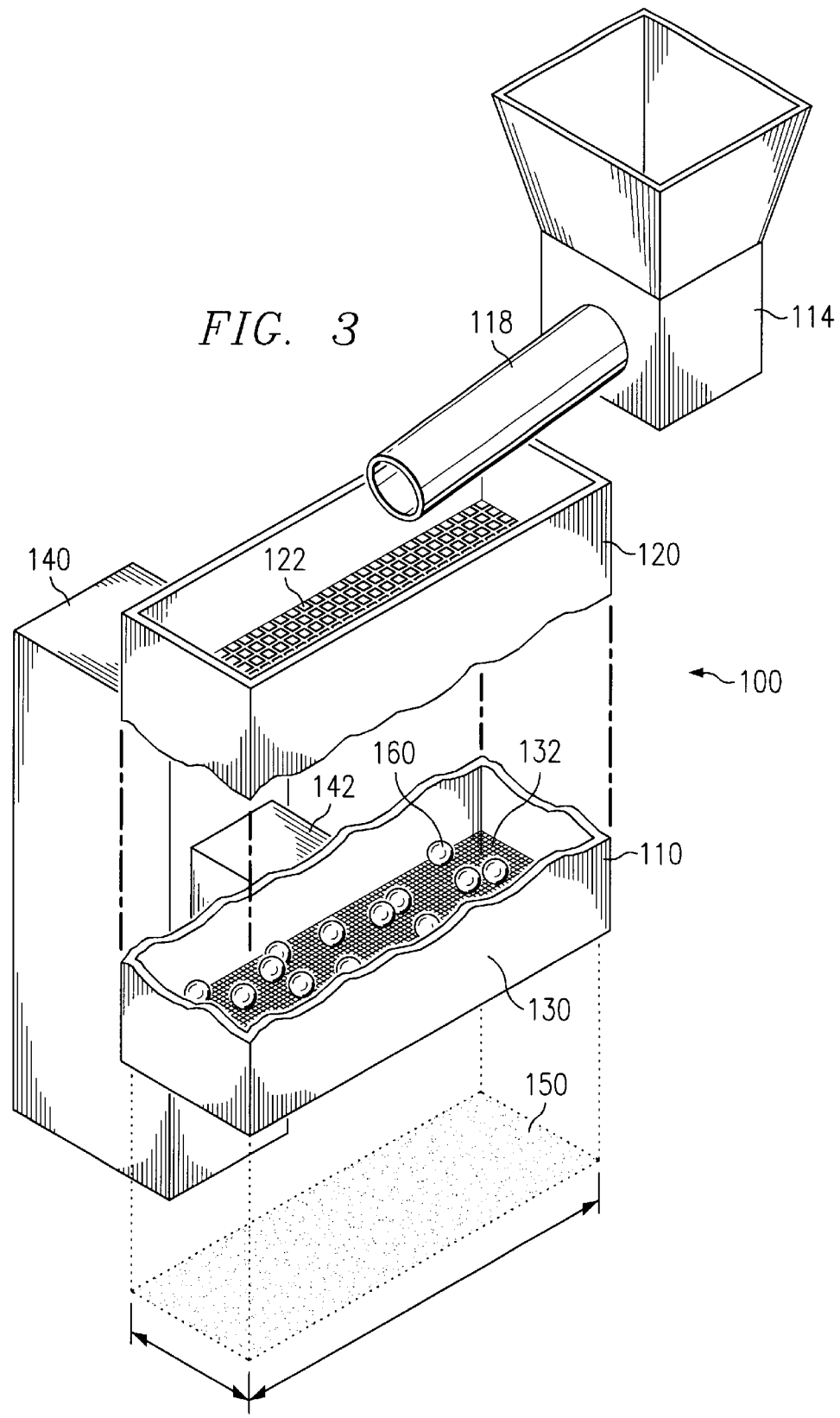
FIG. 3 is an exploded top perspective view of the seasoning applicator of FIG. 2 shown without seasoning in the applicator.

FIG. 2 and 3 show a two-dimensional seasoning applicator 100 in accordance with the 10 invention. Seasoning applicator 100 has a seasoning assembly 110 where seasoning 112 is fed from a silo 114. While seasoning assembly 110 is shown having a rectangular box configuration, it can comprise other suitable shapes such as square or circular for example. As to the materials of construction for seasoning assembly 110, any suitable material such as metal, plastic, or combinations thereof can be used.

Seasoning 112 can comprise a powdered mixture of any suitable snack food seasoning such as salt, barbecue flavoring, sour cream and onion flavor, vinegar flavor, cheese, and others. The rate of seasoning application can be controlled for example with a screw feeder 116, which can be fed gravimetrically or volumetrically.

Seasoning 112 is fed down into an open top assembly 120 of seasoning assembly 110. Therein, seasoning 112 collects on a top screen 122 and is distributed across top screen 122 via vibratory mechanism 140. The openings within screen 122 (the gauge of the screen) are sufficiently large enough to allow sufficient quantities of seasoning 112 to filter through screen 122 and yet small enough to impede the flow-through of seasoning 112 to assure a relatively even distribution of seasoning 112 passing though to lower tray assembly 130.

As seasoning 112 collects on screen 132 of lower tray assembly 130, a predetermined amount of seasoning 112 passes through the openings within screen 132 down toward snack food products 180. Unlike conventional seasoning devices, which produce a relatively thin curtain of seasoning, a two-dimensional seasoning pattern 150 is produced. This pattern 150 is a shower of seasoning extending across a predetermined length and width. The length of pattern 150 is determined in the direction of travel of the moving tumbling bed of snack food products, and the width is determined in the cross direction of travel.

In use, two-dimensional seasoning pattern 150 falls from screen 132 onto snack food products 180, which is being tumbled on tumbling surface 170. This is unlike prior art devices that apply seasoning as a thin curtain. With sifting of the seasoning through screens 122 and 132 and the increased application area of seasoning pattern 150, snack food products 180 has seasoning applied in an even, uniform, and consistent pattern.

To promote seasoning 112 to flow through screens 122 and 132, vibratory mechanism 140 can be used. Vibratory mechanism 140 can comprise any known vibrating mechanism such as a mechanical sieve shaker. The vibratory mechanism 140 is attached to seasoning assembly 110 by shaker arm 142. As arm 142 is oscillated from vibratory mechanism 140 in, for example, a back-and-forth motion, seasoning assembly 110 is vibrated. This vibrating motion will promote seasoning to become fluidized and flow through screen 122. Additionally, any large clusters of seasoning 112, which may form because of moisture, will disintegrate at least in part. Seasoning 112 then flows onto screen 132 in a random and even distribution. Again, vibrations will promote disintegration of any remaining seasoning clusters remaining in seasoning 112 in lower tray assembly 130. Optionally, captive balls 160 can be added onto lower tray assembly 130 for anti-blinding purposes promoting the further disintegration of any remaining seasoning clusters. Captive balls 16.0 are round balls made from a suitable material such as metal or plastic. While shown as round balls, balls 160 could be of other shapes such as cubes or other multi-sided objects. The size and quantity can be varied depending on the type of seasoning and overall size of seasoning assembly 110. With vibrating screens 122 and 130 and captive balls 160, an even distribution of seasoning 112 is produced within pattern 150.

Figure 4:
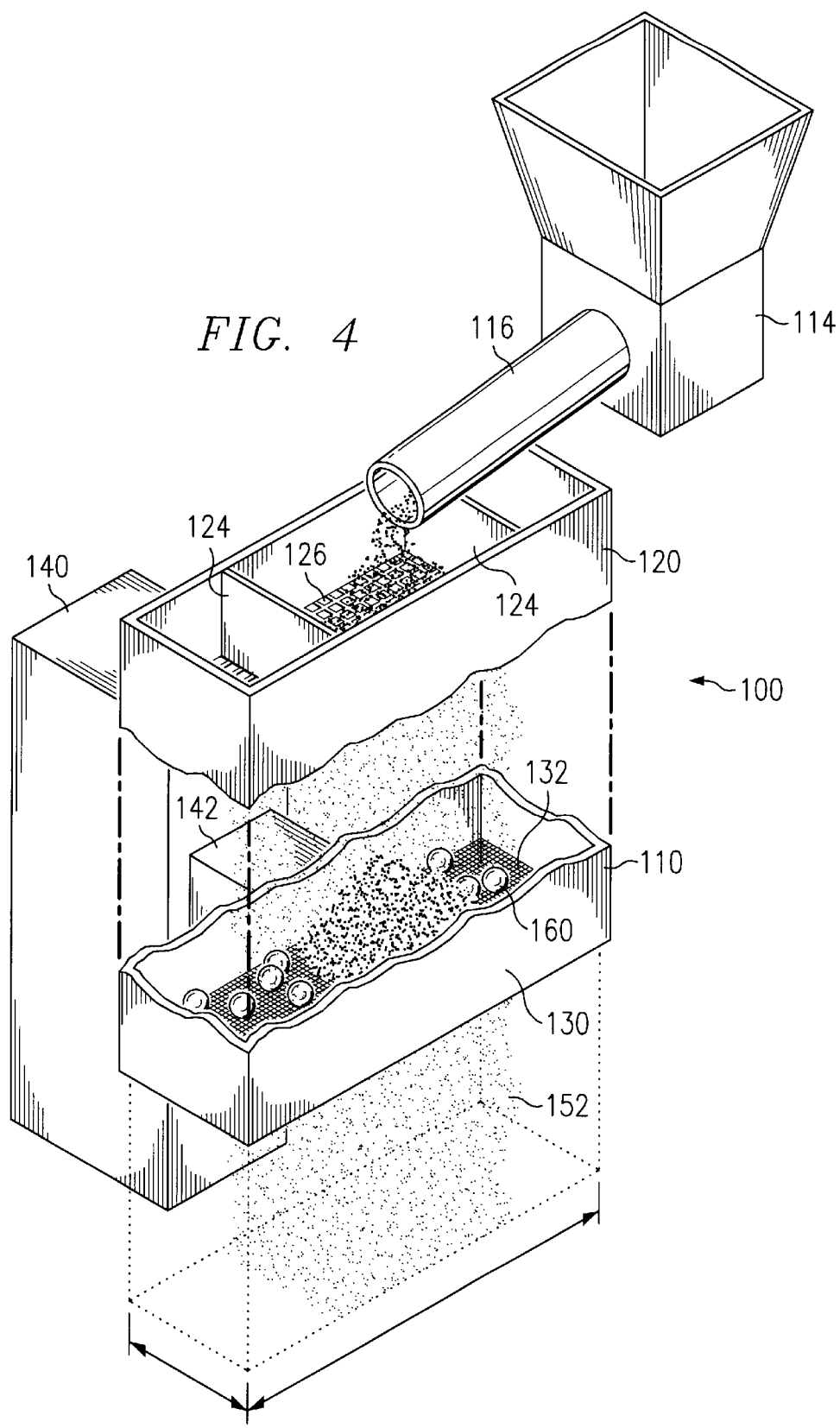
FIG. 4 is an exploded top perspective view of an alternative embodiment of a seasoning applicator of the invention shown with a reduced seasoning pattern.

FIG. 4 shows optional vertical partition walls 124 extending upward from screen 122. Each partition wall 124 divides an interior portion of top assembly 120. As shown in FIG. 4, seasoning assembly 110 has an exemplary configuration of a rectangular box. Two partition walls 124 are shown extending across the width of top assembly 120 creating reduced region 126. Seasoning 112 thereby will accumulate only in reduced region 126 up to partition walls 124 and will pass through screen 122 under region 126. The seasoning will then pass through screen 132 creating a reduced region of seasoning 152. This is particularly advantageous when a reduced bed of moving snack food products 180 is being seasoned. Thereby, the pattern of seasoning being applied can be appropriately matched to the exposed surface of the bed of snack food products 180 being seasoned so that the width of the seasoning curtain is about the same as the width of the bed of snack food products 180. This results in economic savings by applying the appropriate amount of seasoning 112 without unnecessary waste. Further, seasoning 112 that falls on exposed tumbler wall, not on the bed of snack food products 180, can be problematic thereby diminishing product quality. The width of region 126 can be easily adjusted with the inclusion of slats (not shown) to be formed in the interior walls of top assembly 120. To retain a partition wall 124 in a desired position, partition wall 124 can be slid into position. Alternatively, partition walls can be fixed into a desired position with other retaining mechanisms such as bolts or clamps.

With the use of a seasoning applicator 100, improved seasoning coverage uniformity can be realized. The two-dimensional seasoning pattern 150 causes seasoning 112 to be distributed more evenly across a moving bed of snack food products 180. By producing snack food products with uniform seasoning coverage, consumer satisfaction is improved. Also, by limiting the size of the seasoning pattern 152 with the use of partition walls 124, the amount of seasoning applied can be appropriately matched to the size of the bed of snack food products 180 being seasoned on tumbling surface 170.

While the invention has been particularly shown and described with reference to a preferred embodiment, it will be understood by those skilled in the art that various changes in form and detail may be made therein without departing from the spirit and scope of the invention.

What is claimed is:

1. A seasoning applicator for applying seasoning onto snack food products, comprising:
   a seasoning assembly having first and second layers wherein the first layer is disposed above the second layer;
   a fixed top screen extending across a portion of the first layer;
   one or more partition walls extending upward from the top screen;
   a fixed bottom screen extending across a portion of the second layer; and a vibratory mechanism disposed in communication with the seasoning assembly whereby seasoning is promoted through the first and second layers to create a two-dimensional seasoning pattern for seasoning the snack food products.

2. The seasoning applicator of claim 1 further comprising:

a tumbling bed disposed beneath the seasoning assembly for tumbling the snack food products while seasoning is applied thereto.

3. The seasoning applicator of claim 2 wherein the first layer of the seasoning assembly is about the same width as the tumbling bed to create a two-dimensional seasoning pattern that is about the same width as the tumbling bed.

4. The seasoning applicator of claim 1 wherein one or more shaped objects are included in the second layer to promote disintegration of seasoning clusters.

5. The seasoning applicator of claim 4 wherein the shaped objects are balls.

6. The seasoning applicator of claim 1 wherein the position of the one or more partition walls is selectable.

7. The seasoning applicator of claim 6 wherein the one or more partition walls are positioned to reduce the width of the seasoning pattern created.

8. The seasoning applicator of claim 1 wherein the vibratory mechanism is affixed to an exterior portion of the seasoning assembly.

9. The seasoning assembly of claim 1 wherein the top screen has screen openings larger than screen openings in the bottom screen.

10. A seasoning applicator for applying seasoning onto snack food products, comprising:

a seasoning assembly having first and second layers wherein the first layer is disposed above the second layer;

a top screen extending across a portion of the first layer;

a bottom screen extending across a portion of the second layer;

one or more partition walls continuing across the first layer and extending upward from the top screen; and a vibratory mechanism disposed in communication with the seasoning assembly whereby seasoning is promoted through the first and second layers to create a two-dimensional seasoning pattern for seasoning the snack food products.

11. The seasoning applicator of claim 10 wherein the partition walls are positioned to reduce the width of the seasoning pattern created.

12. The seasoning applicator of claim 11 wherein the position of the one or more partition walls is selectable.

13. The seasoning applicator of claim 10 wherein one or more shaped objects are included in the second layer to promote disintegration of seasoning clusters.

14. The seasoning applicator of claim 13 wherein the shaped objects are balls.

15. A seasoning applicator for applying seasoning onto snack food products, comprising:

a seasoning assembly having first and second layers wherein the first layer is disposed above the second layer;

a top screen extending across a portion of the first layer;

a bottom screen extending across a portion of the second layer;

one or more shaped objects included in the second layer to promote disintegration of seasoning clusters;

one or more partition walls continuing across the first layer and extending upward from the top screen; and a vibratory mechanism disposed in communication with the seasoning assembly whereby seasoning is promoted through the first and second layers to create a two-dimensional seasoning pattern for seasoning the snack food products.

16. The seasoning applicator of claim 15 wherein the partition walls are positioned to reduce the width of the seasoning pattern created.

17. The seasoning applicator of claim 16 wherein the position of the one or more partition walls is selectable.

18. The seasoning applicator of claim 15 wherein the shaped objects are balls.

\* \* \* \* \*